United States Patent
Ni et al.

(10) Patent No.: US 9,596,066 B2
(45) Date of Patent: Mar. 14, 2017

(54) MULTIPOINT CHANNEL STATE INFORMATION REPORTING METHOD AND DEVICE

(71) Applicant: CHINA ACADEMY OF TELECOMMUNICATIONS TECHNOLOGY, Beijing (CN)

(72) Inventors: Hao Ni, Beijing (CN); Qiubin Gao, Beijing (CN); Ranran Zhang, Beijing (CN); Ying Peng, Beijing (CN)

(73) Assignee: China Academy of Telecommunications Techology, Beijing (CN)

( * ) Notice: Subject to any disclaimer, the term of this patent is extended or adjusted under 35 U.S.C. 154(b) by 0 days.

(21) Appl. No.: 14/400,316

(22) PCT Filed: May 10, 2013

(86) PCT No.: PCT/CN2013/075467
§ 371 (c)(1),
(2) Date: Nov. 10, 2014

(87) PCT Pub. No.: WO2013/166988
PCT Pub. Date: Nov. 14, 2013

(65) Prior Publication Data
US 2015/0124726 A1    May 7, 2015

(30) Foreign Application Priority Data
May 10, 2012    (CN) .......................... 2012 1 0143774

(51) Int. Cl.
*H04L 1/00*    (2006.01)
*H04L 5/00*    (2006.01)
(Continued)

(52) U.S. Cl.
CPC .......... *H04L 5/0048* (2013.01); *H04L 1/0026* (2013.01); *H04L 1/0028* (2013.01);
(Continued)

(58) Field of Classification Search
CPC ..... H04W 84/12; H04W 84/13; H04W 84/14; H04W 84/15; H04W 84/16; H04W 80/04;
(Continued)

(56) References Cited

U.S. PATENT DOCUMENTS

| | | | |
|---|---|---|---|
| 2012/0039252 A1 | 2/2012 | Damnjanovic et al. | |
| 2012/0287875 A1* | 11/2012 | Kim ...................... | H04L 5/0048 370/329 |

FOREIGN PATENT DOCUMENTS

| | | |
|---|---|---|
| CN | 102170330 A | 8/2011 |
| CN | 102281128 A | 12/2011 |

(Continued)

OTHER PUBLICATIONS

European Patent Office Communication enclosing Extended European Search Report for corresponding European Patent Application No. 13787891.4, 6 pp., (Jul. 6, 2015).
(Continued)

*Primary Examiner* — Dady Chery
(74) *Attorney, Agent, or Firm* — Blakely, Sokoloff, Taylor & Zafman LLP

(57) ABSTRACT

Disclosed are a multipoint channel state information reporting method and device. The technical solution of the embodiments of the present invention can be applied to configure a corresponding reporting mode for a reference signal resource pair composed of a channel sounding reference signal resource and an interference sounding reference signal resource which are allocated to a terminal device or configure a plurality of channel state information reporting configurations containing corresponding reporting modes,
(Continued)

and allocate to each channel state information reporting configuration a reference signal resource pair composed of a channel sounding reference signal resource and an interference sounding reference signal resource; then, the terminal device report channel state information about corresponding reference signal resource pairs according to corresponding report modes, thereby achieving the purpose that the terminal device reports the channel state information for the one or more transmission points on one or more interference assumptions.

23 Claims, 3 Drawing Sheets

(51) Int. Cl.
*H04W 24/10* (2009.01)
*H04B 7/06* (2006.01)

(52) U.S. Cl.
CPC .......... *H04L 5/0035* (2013.01); *H04L 5/0091* (2013.01); *H04W 24/10* (2013.01); *H04B 7/0626* (2013.01)

(58) Field of Classification Search
CPC ..... H04W 80/05; H04W 80/06; H04W 80/07; H04W 80/08
USPC ................ 370/336, 329, 328, 330, 338, 351
See application file for complete search history.

(56) References Cited

FOREIGN PATENT DOCUMENTS

| CN | 102684835 A | 9/2012 |
|---|---|---|
| WO | WO 2009/118707 A1 | 10/2009 |
| WO | WO 2011/115421 A2 | 9/2011 |
| WO | WO 2011/140062 A1 | 11/2011 |
| WO | WO 2012/020963 A2 | 2/2012 |
| WO | WO 2012/039589 A2 | 3/2012 |

OTHER PUBLICATIONS

PCT Written Opinion of the International Searching Authority for PCT Counterpart Application No. PCT/CN2013/075467, 13 pp. (including English translation), (Aug. 1, 2013).
PCT Notification Concerning Transmittal of International Preliminary Report on Patentability (Chapter I of the Patent Cooperation Treaty) for PCT Counterpart Application No. PCT/CN2013/075467, 16 pp. (including English translation), (Nov. 20, 2014).
PCT International Search Report for PCT Counterpart Application No. PCT/CN2013/075467, 5 pages, (Aug. 1, 2013).
Office Action for corresponding Japanese Patent Application No. 2015-510630, 6 pp., (Nov. 17, 2015).
Huawei, "CSI-RS Pattern Signalling", 3GPP TSG RAN WG1 Meeting #62, R1-104290, Madrid, Spain, 6 pp., (Aug. 23-27, 2010).

* cited by examiner

MULTIPOINT CHANNEL STATE INFORMATION REPORTING METHOD AND DEVICE

CROSS-REFERENCE TO RELATED APPLICATIONS

The present application is a U.S. National Phase Application under 35 U.S.C. §371 of International Application No. PCT/CN2013/075467, filed on May 10, 2013, entitled MULTIPOINT CHANNEL STATE INFORMATION REPORTING METHOD AND DEVICE, which claims priority to Chinese Patent Application No. 201210143774.0, filed with the State Intellectual Property Office of China on May 10, 2012, and entitled "Multipoint channel state information reporting method and device", which was incorporated by reference in its entirety.

FIELD OF THE INVENTION

The present invention relates to the field of communications and particularly to a method and a device for reporting multipoint channel state information.

BACKGROUND OF THE INVENTION

The Coordinated Multipoint Transmission/Reception (CoMP) technology is adopted in a Long Term Evolution-Advance (LTE-A) system to lower interference from an adjacent cell to a User Equipment (UE) at the coverage edge of a cell and to improve an experience of the user equipment at the edge of the cell.

The coordinated multipoint transmission/reception technology refers to coordination between multiple transmission points which are separated geographically. Typically the multiple transmission points refer to base stations of different cells or a base station of a cell and multiple Remote Radio Heads (RRHs) controlled by the base station. The coordinated multipoint transmission/reception technology can be categorized into downlink coordinated transmission and uplink joint reception.

Downlink coordinated multipoint transmission is generally further categorized into two transmission schemes of Coordinated Scheduling/Coordinated Beam-forming (CS/CB) and Joint Processing (JP).

One of the multiple transmission points in CS/CB transmission transmits a useful signal to the user equipment, whereas the other transmission points lower interference to the user equipment through joint scheduling and beam-forming.

The JP scheme can be further categorized into Joint Transmission (JT) and Dynamic Point Selection (DPS). The multiple transmission points in JT transmit useful signals to the user equipment concurrently to thereby enhance received signals of the user equipment. A transmission point for the user equipment is switched dynamically in DPS transmission by always selecting from the coordinating transmission points the transmission point optimum for the user equipment to transmit signals to the user equipment. These coordinated multipoint transmission schemes can be used in combination. Also a Dynamic Blanking (DB) scheme may be combined with these coordinated multipoint transmission schemes, wherein some transmission points are configured, dynamically in some time-frequency resources, not to transmit any signal.

In order to support coordinated multipoint transmission/reception, the network configures one or more downlink reference signals for channel measurement, e.g., a Channel State Information-Reference Signal (CSI-RS). The user equipment can measure the downlink channel of each transmission point by using the downlink channel measurement reference signal configured by the network. The network can further configure one or more downlink reference signals for interference measurement, and the user equipment can measure interference under one or more interference assumptions by using the interference measurement downlink reference signal. The user equipment can obtain channel state information of each transmission point under the one or more interference assumptions from the measured downlink channels of the respective transmission points and interference under the respective interference assumptions. Under different interference assumptions, channel state information of a transmission point may include different Rank Indicators (RIs)/Pre-coding Matrix Indicators (PMIs) and Channel Quality Indicators (CQIs). In the process above, each transmission point corresponds to a reference signal resource possibly including one or more physical transmission points; and each interference assumption corresponds to an interference measurement reference signal resource.

After obtaining the channel state information, the user equipment reports the channel state information under the one or more interference assumptions according to the requirement for the transmission scheme. In the Long Term Evolution (LTE) system, two channel state information report schemes are supported, which are a periodical report based upon a Physical Uplink Control Channel (PUCCH) and a non-periodical report based upon a Physical Uplink Shared Channel (PUSCH) respectively.

The periodical report based upon a PUCCH includes report modes 1-0, 1-1, 2-0 and 2-1, wherein report modes 1-0 and 1-1 include broadband CQI information, and report modes 2-0 and 2-1 include user selected sub-band CQI information; and report modes 1-0 and 2-0 include no PMI information, and report modes 1-1 and 2-1 include PMI information. Furthermore, report mode 1-1 further includes sub-mode 1 and sub-mode 2 for transmission mode 9, wherein channel state information of 8 antenna ports of the base station is reported. The report modes above include all of report types 1, 1*a*, 2, 2*a*, 2*b*, 2*c*, 3, 4, 5 and 6, which are configured to report CQI, RI/PMI and Pre-coding Type Indicator (PTI) information, wherein report type 1 supports a user selected sub-band CQI report; report type 1*a* supports a user selected sub-band CQI and second PMI report; report types 2, 2*b* and 2*c* support a broadband CQI and PMI report; report type 2*a* supports a broadband PMI report; report type 3 supports an RI report; report type 4 supports a broadband CQI report; report type 5 supports an RI and broadband PMI report; and report type 6 supports an RI and RTI report.

The network configures report types of channel state information reports of each serving cell, a report periodicity and a sub-frame offset of a CQI/PMI report, and a report periodicity and a sub-frame offset of an RI report semi-statically through higher-layer signaling.

Different periodicities and sub-frame offsets may be configured between the different report types of each serving cell reported by the user equipment, and collision may occur in a channel information report process. When the collision occurs, the user equipment decides a report type according to the priorities of the report types and in the order of the numbers of the serving cells. Collision between report types includes: collision between report types at different priorities of the same serving cell, collision between report types at different priorities of different serving cells and collision between report types at the same priority of different serving cells. In collision between report types at different priorities of the same serving cell, the priorities of report type 3, 5 and 6 are higher than those of report types 1, 1a, 2, 2a, 2b, 2c and 4, wherein the report types at lower priorities are discarded. In collision between report types at different priorities of different serving cells, the priorities of report types 3, 5, 6 and 2a are higher than those of report types 1, 1a, 2, 2b, 2c and 4, wherein the report types at lower priorities are discarded. The network can further allocate a serving cell number to each serving cell, and in collision between report types at the same priority of different serving cells, report types of serving cells with higher numbers are discarded.

The non-periodical channel information report based a PUSCH includes report modes 1-2, 2-0, 2-2, 3-0 and 3-1, wherein report mode 1-2 includes broadband CQI information, report modes 2-0 and 2-2 include user selected sub-band CQI information, and report modes 3-0 and 3-1 include higher-layer configured sub-band CQI information; and report modes 2-0 and 3-0 include no PMI information, the report mode 3-1 report single information, and report modes 1-2 and 2-2 include multiple PMI information. The network configures a report mode for a non-periodical feedback of the user equipment semi-statically through higher-layer signaling. The network transmits DCI signaling to the user equipment over a Physical Downlink Control Channel (PDCCH) to trigger the non-periodical channel information report.

The inventors have identified during making of the present invention at least the following problem:

The existing periodical and non-periodical channel state information report methods are designed for a transmission scheme of a single transmission point for which only one report mode is configured, wherein report information in the report mode is based upon the same interference measurement so that it is impossible to support multiple transmission points for each of which channel state information under one or more interference assumptions is reported.

SUMMARY OF THE INVENTION

Embodiments of the present invention provide a method and a device for reporting multipoint channel state information so as to address the problem in the prior art of the impossibility of a user equipment to report channel state information under one or more interference assumptions.

In order to attain the object above, in an aspect, an embodiment provides a method for reporting multipoint channel state information, which includes at least the following operations:

configuring, by a network side device, one or more pairs of reference signal resources and report modes for a user equipment; and receiving, by the network side device, channel state information according to the pairs of reference signal resources reported by the user equipment respectively with corresponding report modes, wherein the pair of reference signal resources includes one downlink channel measurement reference signal resource and one downlink interference measurement reference signal resource, and the downlink channel measurement reference signal resource is particularly a reference signal resource configured by the network side device for the user equipment to measure a downlink channel of a transmission point, and the downlink interference measurement reference signal resource is particularly a reference signal resource configured by the network side device for the user equipment to measure interference under an interference assumption.

In another aspect, an embodiment further provides a network side device including:

a configuring component configured to configure one or more pairs of reference signal resources and report modes for a user equipment; and a receiving component configured to receive channel state information according to corresponding pairs of reference signal resources reported by the user equipment respectively with the report modes configured by the configuring component;

wherein the pair of reference signal resources includes one downlink channel measurement reference signal resource and one downlink interference measurement reference signal resource, and the downlink channel measurement reference signal resource is particularly a reference signal resource configured by the network side device for the user equipment to measure a downlink channel of a transmission point, and the downlink interference measurement reference signal resource is particularly a reference signal resource configured by the network side device for the user equipment to measure interference under an interference assumption.

In another aspect, an embodiment further provides a method for reporting multipoint channel state information, which includes at least the following operations:

receiving, by a user equipment, one or more pairs of reference signal resources and report modes configured by a network side device; and reporting, by the user equipment, channel state information according to the pairs of reference signal resources to the network side device respectively with corresponding report modes;

wherein the pair of reference signal resources includes one downlink channel measurement reference signal resource and one downlink interference measurement reference signal resource, and the downlink channel measurement reference signal resource is particularly a reference signal resource configured by the network side device for the user equipment to measure a downlink channel of a transmission point, and the downlink interference measurement reference signal resource is particularly a reference signal resource configured by the network side device for the user equipment to measure interference under an interference assumption.

In another aspect, an embodiment further provides a user equipment including:

a receiving component configured to receive one or more pairs of reference signal resources and report modes configured by a network side device; and a reporting component configured to report channel state information according to the pairs of reference signal resources to the network side device respectively with the corresponding report modes received by the receiving component;

wherein the pair of reference signal resources includes a downlink channel measurement reference signal resource and a downlink interference measurement reference signal resource, and the downlink channel measurement reference signal resource is particularly a reference signal resource configured by the network side device for the user equipment to measure a downlink channel of a transmission point, and the downlink interference measurement reference signal resource is particularly a reference signal resource configured by the network side device for the user equipment to measure interference under an interference assumption.

Compared with the prior art, the technical solution according to the embodiments of the present invention has the following advantages:

With the technical solution according to the embodiment of the present invention, the corresponding report modes can be configured for the pairs of reference signal resources composed of the channel measurement reference signal resources and the interference measurement reference signal resources allocated to the user equipment, or the user equipment can be configured with the multiple channel state information report configurations including the corresponding report modes, and a pair of reference signal resources composed of a channel measurement reference signal resource and an interference measurement reference signal resource can be configured to each channel state information report configuration, and then the user equipment can report the channel state information according to the corresponding pairs of reference signal resources with the corresponding report modes, thereby realizing that the user equipment reports the channel state information under one or more interference assumptions for the one or more transmission points.

DETAILED DESCRIPTION OF THE EMBODIMENTS

As described in the Background of the Invention, a user equipment needs to report channel state information of one or more transmission points to a network in downlink coordinated multipoint transmission. The channel state information of each transmission point may include channel state information of the transmission point under one or more interference assumptions. However processing of such a report can not be performed in the prior art.

In order to address this drawback of the prior art, an embodiment provides a method for reporting channel state information of multiple transmission points, wherein a pair of a channel measurement reference signal resource and an interference measurement reference signal resource configured to a user equipment is configured with a report mode, or a system configures the user equipment with multiple report mode configurations and configures a pair of a channel measurement reference signal resource and an interference measurement reference signal resource to each report mode configuration, so that the user equipment reports channel state information under one or more interference assumption for one or more transmission points.

Figure 1:
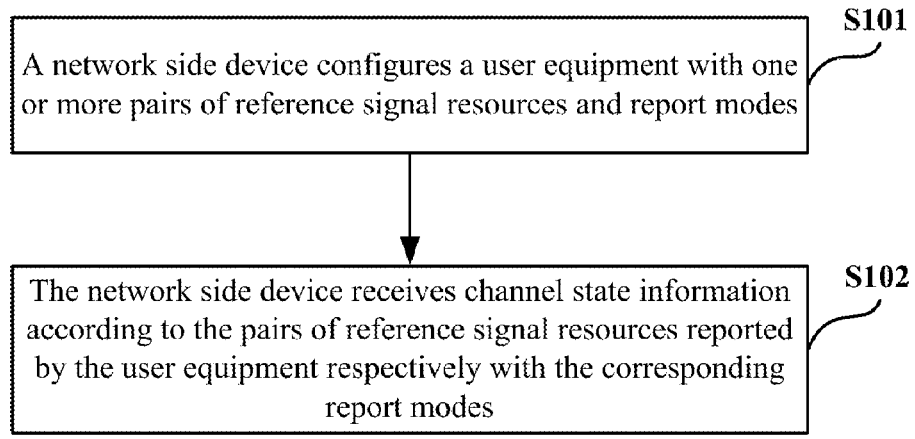
FIG. 1 is a schematic flow chart of a method for reporting multipoint channel state information according to an embodiment on a network side device.
Figure 2:
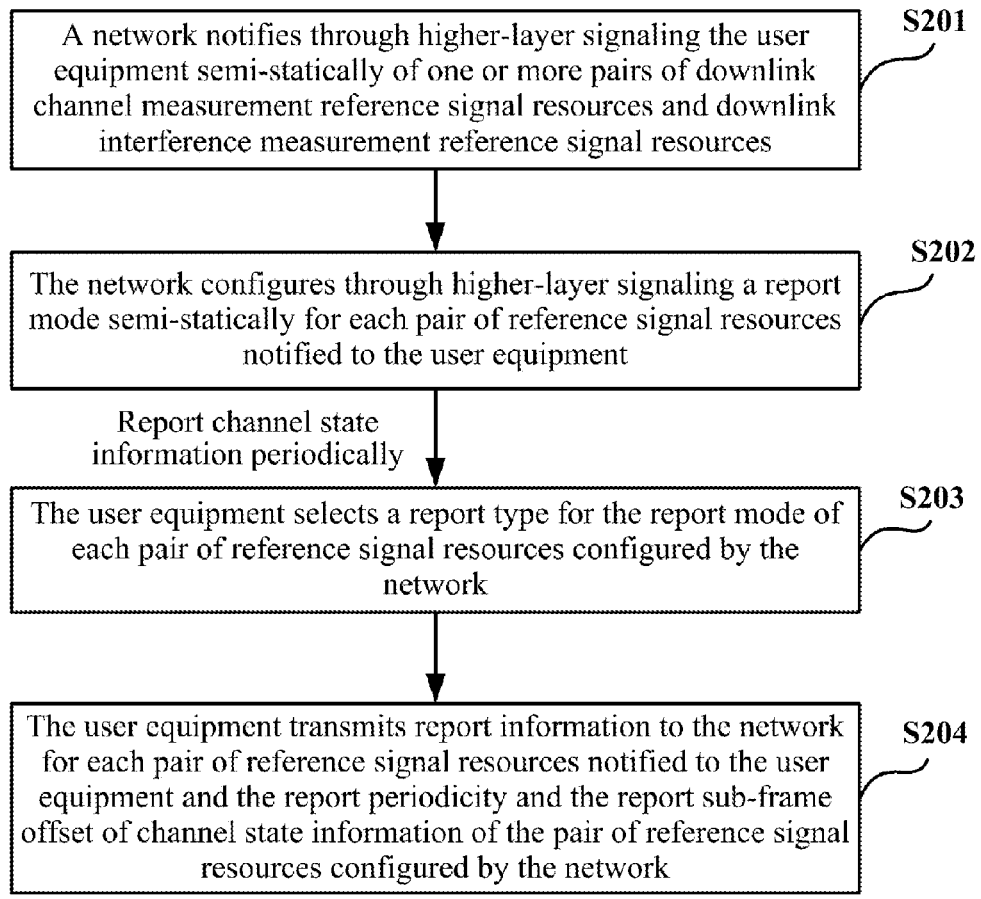
FIG. 2 is a schematic flow chart of a method for reporting multipoint channel state information by configuring report modes for multiple pairs of reference signal resources according to an embodiment.

FIG. 1 illustrates a schematic flow chart of a method for reporting multipoint channel state information according to an embodiment on a network side device, the method particularly including the following operations:

In operation S101, a network side device configures a user equipment with one or more pairs of reference signal resources and report modes.

The pair of reference signal resources is composed of a downlink channel measurement reference signal resource and a downlink interference measurement reference signal resource.

The downlink channel measurement reference signal resource is particularly a reference signal resource configured by the network side device for the user equipment to measure a downlink channel of a transmission point.

The downlink interference measurement reference signal resource is particularly a reference signal resource configured by the network side device for the user equipment to measure interference under an interference assumption.

In a practical application scenario, this operation is performed in two implementations to be described below in details.

In a first implementation, the network side device configures the user equipment with one or more pairs of reference signal resources and then configures a corresponding report mode for each pair of reference signal resources configured for the user equipment.

The pairs of reference signal resources can be configured in two schemes as follows.

In scheme A, the resources are numbered separately, and then configured through pairs of numbers composed of two numbers.

Firstly the network side device respectively numbers the respective reference signal resources for measuring downlink channels of the transmission points, and the respective reference signal resources for measuring interference under different interference assumptions, configured by the network side device for the user equipment.

Then the network side device transmits pairs of numbers composed of the numbers of the downlink channel measurement reference signal resources and the numbers of the downlink interference measurement reference signal resources included in the one or more pairs of reference signal resources to be configured for the user equipment to the user equipment.

In scheme B, the resources are combined in pairs, and the combinations are numbered, and the numbers of the pairs of resources are configured.

Firstly, the network side device combines in pairs respectively the respective reference signal resources for measuring downlink channels of the transmission points, and the respective reference signal resources for measuring interference under different interference assumptions, configured by the network side device for the user equipment and numbers the respective combinations respectively.

Then the network side device transmits the numbers corresponding to the one or more pairs of reference signal resources to be configured for the user equipment respectively to the user equipment.

In a particular application scenario, the pairs of reference signal resources can be configured particularly in either of the schemes above according to the practical requirement without departing from the scope of the present invention.

On the other hand, in this operation, the network side device configures the report modes for the pairs of reference signal resources particularly as a periodical report mode and/or a non-periodical report mode.

The periodical report mode is particularly an existing periodical report mode of channel state information, or a periodical report mode of channel state information obtained by modifying an existing periodical report mode of channel state information, or a redefined periodical report mode of channel state information.

The non-periodical report mode is particularly an existing non-periodical report mode of channel state information, or a non-periodical report mode of channel state information obtained by modifying an existing non-periodical report mode of channel state information, or a redefined non-periodical report mode of channel state information.

Furthermore, some parameters can be further configured, particularly by configuring at least the following two parameters:

(1) A Priority Parameter

When the network side device configures a report mode for a pair of reference signal resources as a periodical report mode and/or a non-periodical report mode, the network side device allocates a priority number to the pair of reference signal resources.

In a practical application, particularly a correspondence relationship between a higher or lower priority number and a higher or lower priority can be specified, for example, there is a higher priority with a lower priority number, without departing from the scope of the present invention.

(2) A Report Transmission Parameter

When the network side device configures a report mode for a pair of reference signal resources as a periodical report mode, the network side device configures a report periodicity and report sub-frame offset information of channel state information for the pair of reference signal resources.

The two parameters will not be configured in any requisite order but can be configured in another order without departing from the scope of the present invention.

In a second implementation, the network side device configures the user equipment with one or more channel state information report configurations, wherein each channel state information report configuration includes a report mode respectively, and then configures corresponding one of the pairs of reference signal resources to each channel state information report configuration.

In a particular process scenario, the channel state information report configurations can be configured particularly by configuring the numbers or other identification information thereof, wherein they are configured by configuring the numbers thereof as follows.

The network side device transmits one or more report configuration numbers to the user equipment, wherein each report configuration number transmitted by the network side device to the user equipment is different from another report configuration number transmitted by the network side device to the user equipment.

In this operation, the network side device configures the report modes for the pairs of reference signal resources particularly as a periodical report mode and/or a non-periodical report mode.

The periodical report mode is particularly an existing periodical report mode of channel state information, or a periodical report mode of channel state information obtained by modifying an existing periodical report mode of channel state information, or a redefined periodical report mode of channel state information.

The non-periodical report mode is particularly an existing non-periodical report mode of channel state information, or a non-periodical report mode of channel state information obtained by modifying an existing non-periodical report mode of channel state information, or a redefined non-periodical report mode of channel state information.

Furthermore, some parameters can be further configured, particularly by configuring at least the following two parameters.

(1) A Priority Parameter

When the report mode included in the channel state information report configuration is a periodical report mode and/or a non-periodical report mode, the network side device allocates a priority number to the channel state information report configuration.

In a practical application, particularly a correspondence relationship between a higher or lower priority number and a higher or lower priority can be specified, for example, there is a higher priority with a lower priority number, without departing from the scope of the present invention.

(2) A Report Transmission Parameter

When the report mode included in the channel state information report configuration is a periodical report mode, the network side device configures a report periodicity and a report sub-frame offset of channel state information for the channel state information report configuration.

The two parameters will not be configured in any requisite order but can be configured in another order without departing from the scope of the present invention.

Similarly to the first implementation, in this implementation, the pairs of reference signal resources can also be configured in two schemes as follows:

In scheme A, the resources are numbered separately, and then configured through pairs of numbers composed of two numbers.

Firstly, the network side device respectively numbers the respective reference signal resources for measuring downlink channels of the transmission points, and the respective reference signal resources for measuring interference under different interference assumptions, configured by the network side device for the user equipment.

Then the network side device transmits pairs of numbers composed of the numbers of the downlink channel measurement reference signal resources and the numbers of the downlink interference measurement reference signal resources included in the pairs of reference signal resources to be configured for the channel state information report configurations to the user equipment corresponding to the channel state information report configurations.

In scheme B, the resources are combined in pairs, and the combinations are numbered, and the numbers of the pairs of resources are configured.

Firstly, the network side device combines in pairs respectively the respective reference signal resources for measuring downlink channels of the transmission points, and the respective reference signal resources for measuring interference under different interference assumptions, configured by the network side device for the user equipment and numbers the respective combinations respectively.

Then the network side device transmits the numbers corresponding to the pairs of reference signal resources to be configured for the channel state information report configurations, to the user equipment corresponding to the channel state information report configurations.

In a particular application scenario, the pairs of reference signal resources can be configured particularly in either of the schemes above according to the practical requirement without departing from the scope of the present invention.

In the operation S102, the network side device receives channel state information according to the pairs of reference signal resources reported by the user equipment respectively with the corresponding report modes.

Following the description of the operation S101, the report modes can be a periodical report mode and/or a non-periodical report mode, and the following particular description can be further given below.

In correspondence to the first implementation in the operation S101, when the network side device configures a report mode for a pair of reference signal resources as a periodical report mode, a process of the operation S102 above is particularly as follows:

(a1) The user equipment selects a report type according to the periodical report mode configured by the network side device.

The report type is particularly an existing report type of the periodical report mode, or a report type obtained by modifying an existing report type of the periodical report mode, or a redefined report type of the periodical report mode.

(a2) The user equipment reports channel state information of the pair of reference signal resources according to the corresponding report type and the report periodicity and the report sub-frame offset of channel state information configured by the network side device.

It shall be further noted that if a corresponding priority number is configured in the operation S101, then when channel state information of a report type at the same priority of different pairs of reference signal resources reported by the user equipment collides, the user equipment compares priority numbers configured by the network side device for the different pairs of reference signal resources and reports the channel state information of the pair of reference signal resources corresponding to the priority number representing a higher priority.

In correspondence to the second implementation in the operation S101, when the report mode included in the channel state information report configuration includes a periodical report mode, the operation S102 above particularly includes the following process:

(b1) The user equipment selects a report type according to the periodical report mode included in the channel state information report configuration.

The report type is particularly an existing report type of the periodical report mode, or a report type obtained by modifying an existing report type of the periodical report mode, or a redefined report type of the periodical report mode.

(b2) The user equipment reports channel state information of the pair of reference signal resources allocated to the channel state information report configuration, according to the corresponding report type and the report periodicity and the report sub-frame offset of channel state information configured by the network side device for the channel state information report configuration.

It shall be further noted that if a corresponding priority number is configured in the operation S101, then when channel state information of a report type at the same priority of different channel state information report configurations reported by the user equipment collides, the following process is further included in operation S102.

The user equipment compares priority numbers configured by the network side device for the different channel state information report configurations, and reports the channel state information of the pair of reference signal resources of the channel state information report configuration corresponding to the priority number representing a higher priority.

The implementation of a method for reporting multipoint channel state information according to the embodiment of the present invention on a network side device has been described above, and correspondingly also a corresponding process needs to be performed on the user equipment side, and since the corresponding process has been set forth in the description above, a repeated description thereof will be omitted here.

The technical solution according to the embodiment of the present invention has the following advantage over the prior art.

With the technical solution according to the embodiment of the present invention, the corresponding report modes can be configured for the pairs of reference signal resources composed of the channel measurement reference signal resources and the interference measurement reference signal resources allocated to the user equipment, or the user equipment can be configured with the multiple channel state information report configurations including the corresponding report modes, and a pair of reference signal resources composed of a channel measurement reference signal resource and an interference measurement reference signal resource can be allocated to each channel state information report configuration, and then the user equipment can report the channel state information according to the corresponding pairs of reference signal resources with the corresponding report modes, thereby realizing that the user equipment reports the channel state information under one or more interference assumptions for the one or more transmission points.

The technical solution according to the embodiment of the present invention will be described below respectively in correspondence to the first implementation and the second implementation above, in connection with particular application scenarios.

Firstly, in correspondence to the first implementation above, an embodiment provides a method for reporting multipoint channel state information by configuring report modes for multiple pairs of reference signal resources.

In the operation S201, a network notifies, through higher-layer signaling, the user equipment semi-statically of one or more pairs of downlink channel measurement reference signal resources and downlink interference measurement reference signal resources (simply "pair(s) of reference signal resources" below for short).

Each pair of reference signal resources notified of by the network includes only one downlink channel measurement reference signal resource and one downlink interference measurement reference signal resource.

The downlink channel measurement reference signal resource in each pair of reference signal resources notified by the network is included in one or more reference signal resources configured by the network for the user equipment to measure a downlink channel of a transmission point. The downlink interference measurement reference signal resource in each pair of reference signal resources notified by the network is included in one or more reference signal resources configured by the network for the user equipment to measure interference under different interference assumptions.

In a practical application, the network can notify the user equipment of the one or more pairs of reference signal resources in such a way that the network separately numbers the downlink channel measurement reference signal resources configured for the user equipment, and notifies through higher-layer signaling the user equipment of the number of each downlink channel measurement reference signal resource configured for the user equipment; and the network separately numbers the downlink interference measurement reference signal resources configured for the user equipment, and notifies through higher-layer signaling the user equipment of the number of each downlink interference measurement reference signal resource configured for the user equipment. The network notifies through higher-layer signaling the user equipment of the numbers of the downlink channel measurement reference signal resources and the numbers of the downlink interference measurement reference signal resources in the pairs of reference signal resources to be notified to the user equipment, to thereby notify the user equipment of the pairs of reference signal resources.

The network can notify the user equipment of the one or more pairs of reference signal resources alternatively in such a way that the network numbers combinations in pairs of all the downlink channel measurement reference signal resources and the downlink interference measurement reference signal resources configured for the user equipment. The network notifies through higher-layer signaling the user equipment of the numbers of the combinations in pairs of all the downlink channel measurement reference signal resources and the downlink interference measurement reference signal resources configured for the user equipment. The network notifies through higher-layer signaling the user equipment of the numbers of the combinations in pairs of the downlink channel measurement reference signal resources and the downlink interference measurement reference signal resources in the pairs of reference signal resources to be notified to the user equipment, to thereby notify the user equipment of the pairs of reference signal resources.

In the operation S202, the network configures through higher-layer signaling a report mode semi-statically for each pair of reference signal resources notified to the user equipment.

If a periodical report is made, then the report mode configured by the network can be an existing periodical report mode of channel state information, or a periodical report mode of channel state information obtained by modifying an existing periodical report mode of channel state information, or a redefined periodical report mode of channel state information; and if a non-periodical report is made, then the network configures a report mode semi-statically for each pair of reference signal resources notified to the user equipment, and the report mode configured by the network can be an existing non-periodical report mode of channel state information, or a non-periodical report mode of channel state information obtained by modifying an existing non-periodical report mode of channel state information, or a redefined non-periodical report mode of channel state information.

In order to report channel state information periodically, the network allocates through higher-layer signaling a priority number to each pair of reference signal resources notified to the user equipment. A higher or lower priority represented by the priority number is prescribed between the network and the user equipment. For example, it is prescribed between the network and the user equipment that a lower priority number represents a higher priority.

In order to report channel state information periodically, the network configures through higher-layer signaling a report periodicity and a report sub-frame offset of channel state information for each pair of reference signal resources notified to the user equipment. For example, the network configures a cqi-pmi-ConfigIndex parameter for the pairs of reference signal resources of the user equipment, and the user equipment determines a report periodicity $N_{pd}$ and a report sub-frame offset $N_{OFFSET,CQI}$ of CQI PMI from the parameter; and the network configures a ri-ConfigIndex parameter for the pairs of reference signal resources of the user equipment, and the user equipment determines a report periodicity $M_{RI}$ and a report relative offset $N_{OFFSET,RI}$ of RI from the parameter.

In order to report channel state information periodically, the user equipment further performs the operation S203.

In the operation S203, the user equipment selects a report type for the report mode of each pair of reference signal resources configured by the network.

The report type selected by the user equipment can be an existing report type for the report mode, or a report type for the report mode obtained by modifying an existing report type, or a redefined report type for the report mode.

In the operation S204, the user equipment transmits report information to the network for each pair of reference signal resources notified to the user equipment, according to the report periodicity and the report sub-frame offset of channel state information of the pair of reference signal resources configured by the network.

When report types at the same priority of different pairs of reference signal resources collide, the user equipment transmits the report type of the pair of reference signal resources at a higher priority represented by the priority number and discards the report type of the pair of reference signal resources at a lower priority represented by the priority number.

Figure 3:
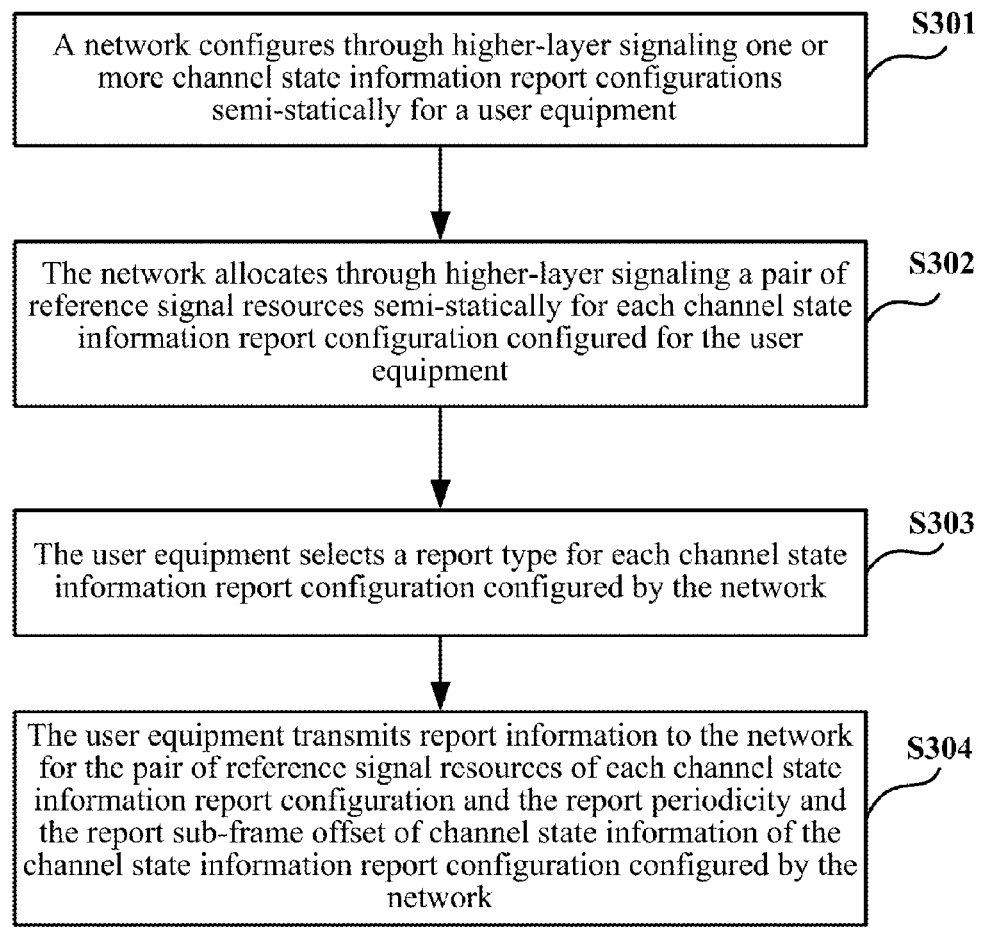
FIG. 3 is a schematic flow chart of a method for reporting multipoint channel state information by configuring multiple channel state information reports according to an embodiment.

In another aspect, in correspondence to the second implementation above, an embodiment provides a method for reporting multipoint channel state information by configuring multiple channel state information reports, a corresponding process of which is as illustrated in FIG. 3.

In the operation S301, a network configures through higher-layer signaling one or more channel state information report configurations semi-statically for a user equipment.

Each channel state information report configuration configured by the network for the user equipment includes a report mode. If a periodical report is made, then the report mode configured by the network can be an existing periodical report mode of channel state information, or a periodical report mode of channel state information obtained by modifying an existing periodical report mode of channel state information, or a redefined periodical report mode of channel state information; and if a non-periodical report is made, then the report mode configured by the network can be an existing non-periodical report mode of channel state information, or a non-periodical report mode of channel state information obtained by modifying an existing non-periodical report mode of channel state information, or a redefined non-periodical report mode of channel state information. If the network configures the user equipment with multiple report configurations, then a part or all of the report configurations configured by the network for the user equipment can include the same report mode.

Each channel state information report configuration configured by the network for the user equipment includes a report configuration number. The report configuration number of any report configuration configured by the network for the user equipment is different from the report configuration number of any other report configuration configured by the network for the user equipment.

In the operation S302, the network allocates through higher-layer signaling a pair of reference signal resources semi-statically for each channel state information report configuration configured for the user equipment.

The pair of reference signal resources allocated by the network to any channel state information report configuration configured for the user equipment is different from the pair of reference signal resources allocated by the network to any other channel state information report configuration configured for the user equipment. The pair of reference signal resources allocated by the network to any channel state information report configuration configured for the user equipment includes only one downlink channel measurement reference signal resource and one downlink interference measurement reference signal resource. The downlink channel measurement reference signal resource in the pair of reference signal resources allocated by the network to any channel state information report configuration configured for the user equipment is included in one or more reference signal resources configured by the network for the user equipment to measure a downlink channel of a transmission point. The downlink interference measurement reference signal resource in the pair of reference signal resources allocated by the network to any channel state information report configuration configured for the user equipment is included in one or more reference signal resources configured by the network for the user equipment to measure interference under different interference assumptions.

The network can allocate one or more pairs of reference signal resources to the channel state information report configurations in such a way that the network separately numbers the downlink channel measurement reference signal resources configured for the user equipment and notifies through higher-layer signaling the user equipment of the number of each downlink channel measurement reference signal resource configured for the user equipment; and the network separately numbers the downlink interference measurement reference signal resources configured for the user equipment, and notifies through higher-layer signaling the user equipment of the number of each downlink interference measurement reference signal resource configured for the user equipment. The network notifies through higher-layer signaling the user equipment of the numbers of the downlink channel measurement reference signal resources and the numbers of the downlink interference measurement reference signal resources in the pairs of reference signal resources to be allocated to the user equipment and the report configuration numbers of the corresponding channel state information report configurations, to thereby notify the user equipment of the pairs of reference signal resources.

The network can allocate one or more pairs of reference signal resources to the channel state information report configurations alternatively in such a way that the network numbers combinations in pairs of all the downlink channel measurement reference signal resources and the downlink interference measurement reference signal resources configured for the user equipment. The network notifies through higher-layer signaling the user equipment of the numbers of the combinations in pairs of all the downlink channel measurement reference signal resources and the downlink interference measurement reference signal resources configured for the user equipment. The network notifies through higher-layer signaling the user equipment of the numbers of the combinations in pairs of the downlink channel measurement reference signal resources and the downlink interference measurement reference signal resources in the pairs of reference signal resources to be allocated to the user equipment to thereby notify the user equipment of the pairs of reference signal resources.

In order to report channel state information periodically, the network configures through higher-layer signaling a report periodicity and a report sub-frame offset of channel state information for each channel state information report configuration configured for the user equipment. For example, the network configures a cqi-pmi-ConfigIndex parameter for the channel state information report configuration of the user equipment, and the user equipment determines a report periodicity $N_{pd}$ and a report sub-frame offset $N_{OFFSET,CQI}$ of CQI/PMI from the parameter; and the network configures a ri-ConfigIndex parameter for the channel state information report configuration of the user equipment, and the user equipment determines a report periodicity $M_{RI}$ and a report relative offset $N_{OFFSET,RI}$ of RI from the parameter.

In order to report channel state information periodically, the user equipment further performs the operation S303.

In the operation S303, the user equipment selects a report type for each channel state information report configuration configured by the network.

The report type selected by the user equipment can be an existing report type for the report mode, or a report type for the report mode obtained by modifying an existing report type, or a redefined report type for the report mode.

In the operation S304, the user equipment transmits report information to the network for the pair of reference signal resources of each channel state information report configuration and the report periodicity and the report sub-frame offset of channel state information of the channel state information report configuration configured by the network.

When report types at the same priority of different channel state information report configurations collide, the user equipment transmits the report type of the channel state information report configuration with a lower report configuration number and discards the report type of the channel state information report configuration with a higher report configuration number.

The technical solution according to the embodiment of the present invention will be further described below in different particular embodiments.

First Embodiment

This embodiment provides a method for reporting multipoint channel state information periodically by configuring report modes for multiple pairs of reference signal resources.

Firstly, a network is configured with the following resources:

Two channel measurement CSI-RS resources: CSI-RS resource a1 and CSI-RS resource a2.

Two interference measurement reference signal resources: interference measurement reference signal resource b1 and interference measurement reference signal resource b2.

Also a user equipment is configured to report RI, CQI and PMI information.

After the configuration above is configured, the network notifies the user equipment of pairs of reference signal resources semi-statically through higher-layer signaling.

In this embodiment, it is assumed that the network notifies the user equipment of three pairs of reference signal resources by notifying the numbers of channel measurement CSI-RS resources and the numbers of interference measurement reference signal resources in the pairs of reference signal resources:

Pair of reference signal resources c1 (CSI resource a1—interference measurement reference signal resource b1);

Pair of reference signal resources c2 (CSI resource a1—interference measurement reference signal resource b2); and Pair of reference signal resources c3 (CSI resource a2—interference measurement reference signal resource b2).

Without loss of generality, the network can also notify of other numbers of pairs of reference signal resources of other combinations of reference signal resources.

The network configures through higher-layer signaling periodical report modes semi-statically for the three pairs of reference signal resources notified above. The network configures report mode 2-1 for pair of reference signal resources c1, report mode 1-1 for pair of reference signal resources c2 and report mode 1-1 for pair of reference signal resources c3.

The network allocates through higher-layer signaling priority numbers semi-statically to the three pairs of reference signal resources notified above.

It is assumed that it is prescribed between the network and the user equipment that a lower priority number represents a higher priority. The network allocates priority number 0 to pair of reference signal resources c1, priority number 1 to pair of reference signal resources c2 and priority number 2 to pair of reference signal resources c3.

The network configures through higher-layer signaling a cqi-pmi-ConfigIndex parameter and a ri-ConfigIndex parameter semi-statically for each pair of reference signal resources. The user equipment determines report periodicities $N_{pd}$ and sub-frame offsets $N_{OFFSET,CQI}$ of CQI/PMI and report periodicities $M_{RI}$ and report relative offsets $N_{OFFSET, RI}$ of RI of pairs of reference signal resources c1, c2 and c3 respectively from the parameters configured by the network.

The user equipment determines an included report type from the configured report mode of each pair of reference signal resources. The user equipment determines that report mode 2-1 configured for pair of reference signal resources c1 includes report type 3, report type 2 and report type 1; report mode 1-1 configured for pair of reference signal resources c2 includes report type 3 and report type 2; and report mode 1-1 configured for pair of reference signal resources c3 includes report type 3 and report type 2. The user equipment determines moments to transmit the respective report types of the pair of reference signal resources according to the report periodicity and the sub-frame offset of report information.

Furthermore it is assumed that report type 2 of pair of reference signal resources c1 and report type 2 of pair of reference signal resources c3 collide in some sub-frame. Report type 2 of pair of reference signal resources c1 and report type 2 of pair of reference signal resources c3 have the same priority of report type in collision of the report types of the different pairs of reference signal resources. The user equipment compares the priority number of pair of reference signal resources c1 with the priority number of pair of reference signal resources c3 and determines that the priority number of pair of reference signal resources c1 is lower. The user equipment discards report type 2 of pair of reference signal resources c3 in collision and transmits report type 2 of pair of reference signal resources c1.

Second Embodiment

This embodiment provides a method for reporting multi-point channel state information non-periodically by configuring report modes for multiple pairs of reference signal resources.

Firstly a network is configured with the following resources:

Three channel measurement CSI-RS resources: CSI-RS resource d1, CSI-RS resource d2 and CSI-RS resource d3.

Two interference measurement reference signal resources: interference measurement reference signal resource e1 and interference measurement reference signal resource e2.

Also a user equipment is configured to report RI, CQI and PMI information.

After the configuration above is configured, the network numbers combinations in pairs of all the channel measurement reference signal resources and the interference measurement reference signal resources:

Pair of reference signal resources f1 (CSI resource d1—interference measurement reference signal resource e1);

Pair of reference signal resources f2 (CSI resource d1—interference measurement reference signal resource e2);

Pair of reference signal resources f3 (CSI resource d2—interference measurement reference signal resource e2);

Pair of reference signal resources f4 (CSI resource d3—interference measurement reference signal resource e2);

Pair of reference signal resources f5 (CSI resource d2—interference measurement reference signal resource e1); and Pair of reference signal resources f6 (CSI resource d3—interference measurement reference signal resource e1).

The network notifies through higher-layer signaling the user equipment of the numbers of the pairs of reference signal resources.

The network notifies through higher-layer signaling the user equipment of the pairs of reference signal resources semi-statically.

In this embodiment, it is assumed that the network notifies the user equipment of four pairs of reference signal resources by notifying the numbers of the pairs of reference signal resources:

Pair of reference signal resources f1, pair of reference signal resources f2, pair of reference signal resources f3 and pair of reference signal resources f4.

Without loss of generality, the network can also notify of other numbers of pairs of reference signal resources of other combinations of reference signal resources.

The network configures through higher-layer signaling non-periodical report modes semi-statically for the four pairs of reference signal resources notified above. The network configures report mode 2-2 for pair of reference signal resources f1 and report mode 1-2 for pairs of reference signal resources f2, f3 and f4.

The network triggers in DCI signaling the user equipment dynamically to feed back channel state information non-periodically.

Third Embodiment

This embodiment provides a method for reporting multi-point channel state information periodically by configuring multiple channel state information report configurations.

Firstly a network is configured with the following resources:

Two channel measurement CSI-RS resources: CSI-RS resource a1 and CSI-RS resource a2.

Two interference measurement reference signal resources: interference measurement reference signal resource b1 and interference measurement reference signal resource b2.

Also a user equipment is configured to report RI, CQI and PMI information.

The network configures through higher-layer signaling three channel state information report configurations for the user equipment: a channel state information report configuration numbered 1, a channel state information report configuration numbered 2 and a channel state information report configuration numbered 3.

Without loss of generality, the network can also configure other numbers of channel state information report configurations for the user equipment.

In this embodiment, it is assumed that the network configures a pair of reference signal resources for each channel state information report configuration of the user equipment by notifying the numbers of channel measurement CSI-RS resources and the numbers of interference measurement reference signal resources in the pair of reference signal resources:

Pair of reference signal resources c1 (CSI resource a1—interference measurement reference signal resource b1) is configured for the channel state information report configuration numbered 1;

Pair of reference signal resources c2 (CSI resource a1—interference measurement reference signal resource b2) is configured for the channel state information report configuration numbered 2; and Pair of reference signal resources c3 (CSI resource a2—interference measurement reference signal resource b2) is configured for the channel state information report configuration numbered 3, The network configures through higher-layer signaling periodical report modes semi-statically for the three channel state information report configurations configured above. The network configures report mode 2-1 for the channel state information report configuration numbered 1; report mode 1-1 for the channel state information report configuration numbered 2; and report mode 1-1 for the channel state information report configuration numbered 3.

The network configures through higher-layer signaling a cqi-pmi-ConfigIndex parameter and a ri-ConfigIndex parameter semi-statically for the three channel state information report configurations configured above. The user equipment determines report periodicities $N_{pd}$ and sub-frame offsets $N_{OFFSET,CQI}$ of CQI/PMI and report periodicities $M_{RI}$ and report relative offsets $N_{OFFSET,RI}$ of RI of the three channel state information report configurations respectively from the parameters configured by the network.

The user equipment determines an included report type from the configured report mode of each channel state information report configuration.

The user equipment determines that report mode 2-1 of the channel state information report configuration numbered 1 includes report type 3, report type 2 and report type 1; report mode 1-1 of the channel state information report configuration numbered 2 includes report type 3 and report type 2; and report mode 1-1 of the channel state information report configuration numbered 3 includes report type 3 and report type 2. The user equipment determines moments to transmit the respective report types of the channel state information report configuration from the report periodicity and the sub-frame offset of report information.

It is assumed that report type 2 of the channel state information report configuration numbered 1 and report type 2 of the channel state information report configuration numbered 3 collide in some sub-frame. Report type 2 of the channel state information report configuration numbered 1 and report type 2 of the channel state information report configuration numbered 3 have the same priority of report type in collision of the report types of the different channel state information report configuration. The user equipment discards report type 2 of the channel state information report configuration numbered 3 with a higher number and transmits report type 2 of the channel state information report configuration numbered 1 with a lower number.

Fourth Embodiment

This embodiment provides a method for reporting multi-point channel state information non-periodically by configuring multiple channel state information report configurations.

Firstly a network is configured with the following resources:

Three channel measurement CSI-RS resources: CSI-RS resource d1, CSI-RS resource d2 and CSI-RS resource d3.

Two interference measurement reference signal resources: interference measurement reference signal resource e1 and interference measurement reference signal resource e2.

Also a user equipment is configured to report RI, CQI and PMI information.

The network numbers combinations in pairs of all the channel measurement reference signal resources and interference measurement reference signal resources:

Pair of reference signal resources f1 (CSI resource d1—interference measurement reference signal resource e1);

Pair of reference signal resources f2 (CSI resource d1—interference measurement reference signal resource e2);

Pair of reference signal resources f3 (CSI resource d2—interference measurement reference signal resource e2);

Pair of reference signal resources f4 (CSI resource d3—interference measurement reference signal resource e2);

Pair of reference signal resources f5 (CSI resource d2—interference measurement reference signal resource e1); and Pair of reference signal resources f6 (CSI resource d3—interference measurement reference signal resource e1).

The network notifies through higher-layer signaling the user equipment of the numbers of the pairs of reference signal resources.

The network configures through higher-layer signaling four channel state information report configurations for the user equipment:

A channel state information report configuration numbered 1, a channel state information report configuration numbered 2, a channel state information report configuration numbered 3 and a channel state information report configuration numbered 4.

Without loss of generality, the network can also configure other numbers of channel state information report configurations for the user equipment.

The network notifies through higher-layer signaling the user equipment semi-statically of the pairs of reference signal resources. In this embodiment, it is assumed that the network configures a pair of reference signal resources for each channel state information report configuration of the user equipment by notifying the number of the pair of reference signal resources: configures pair of reference signal resources f1 for the channel state information report configuration numbered 1; pair of reference signal resources f2 for the channel state information report configuration numbered 2; pair of reference signal resources f3 for the channel state information report configuration numbered 3;

and pair of reference signal resources f4 for the channel state information report configuration numbered 4.

The network configures through higher-layer signaling non-periodical report modes semi-statically for the four channel state information report configurations above respectively. The network configures report mode 2-2 for the channel state information report configuration numbered 1 and report mode 1-2 for the channel state information report configurations numbered 2, 3 and 4.

The network triggers in DCI signaling the user equipment dynamically to feed back channel state information non-periodically.

The technical solution according to the embodiment of the present invention has the following advantage over the prior art:

With the technical solution according to the embodiment of the present invention, the corresponding report modes can be configured for the pairs of reference signal resources composed of the channel measurement reference signal resources and the interference measurement reference signal resources allocated to the user equipment, or the user equipment can be configured with the multiple channel state information report configurations including the corresponding report modes, and a pair of reference signal resources composed of a channel measurement reference signal resource and an interference measurement reference signal resource can be allocated to each channel state information report configuration, and then the user equipment can report the channel state information according to the corresponding pairs of reference signal resources with the corresponding report modes, thereby realizing that the user equipment reports the channel state information under one or more interference assumptions for the one or more transmission points.

Figure 4:
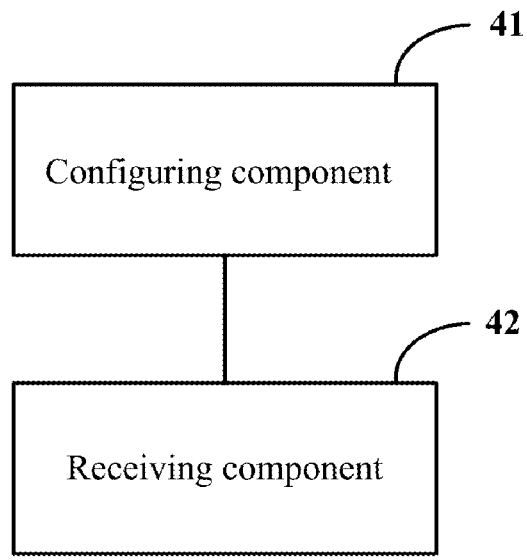
FIG. 4 is a schematic structural diagram of a network side device according to an embodiment.

In order to implement the technical solution according to the embodiment of the present invention, an embodiment further provides a network side device, a schematic structural diagram of which is as illustrated in FIG. 4 and which at least includes:

A configuring component 41 is configured to configure one or more pairs of reference signal resources and report modes for a user equipment; and A receiving component 42 is configured to receive channel state information according to the corresponding pairs of reference signal resources reported by the user equipment respectively with the report modes configured by the configuring component 41;

Wherein the pair of reference signal resources includes one downlink channel measurement reference signal resource and one downlink interference measurement reference signal resource, and the downlink channel measurement reference signal resource is particularly a reference signal resource configured by the network side device for the user equipment to measure a downlink channel of a transmission point, and the downlink interference measurement reference signal resource is particularly a reference signal resource configured by the network side device for the user equipment to measure interference under an interference assumption.

Particularly the configuring component 41 is particularly configured:

To configure the one or more pairs of reference signal resource for the user equipment; and To configure a corresponding report mode respectively for each pair of reference signal resources configured for the user equipment.

It shall be noted that the configuring component 41 is further configured:

When a report mode is configured for a pair of reference signal resources as a periodical report mode and/or a non-periodical report mode, to allocate a priority number to the pair of reference signal resources.

In another particular application scenario, the configuring component 41 is further configured:

To configure a report periodicity and a report sub-frame offset of channel state information for the pair of reference signal resources, when a report mode is configured for a pair of reference signal resources as a periodical report mode.

It shall be further noted that the configuring component 41 is further configured:

To configure the user equipment with one or more channel state information report configurations, each of which includes a report mode respectively; and To allocate corresponding one of the pairs of reference signal resources to each channel state information report configuration.

Further to this, the configuring component 41 is further configured:

When the report mode included in the channel state information report configuration is a periodical report mode and/or a non-periodical report mode, to allocate a priority number to the channel state information report configuration.

In addition, the configuring component 41 is further configured:

To configure a report periodicity and a report sub-frame offset of channel state information for the channel state information report configuration, when the report mode included in the channel state information report configuration is a periodical report mode.

Figure 5:
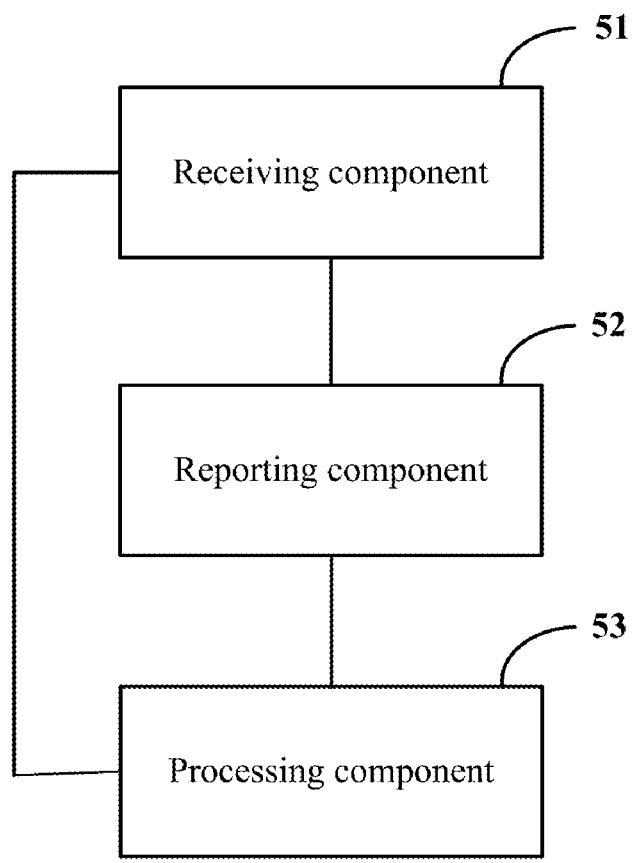
FIG. 5 is a schematic structural diagram of a user equipment according to an embodiment.

Furthermore, an embodiment further provides a user equipment, a schematic structural diagram of which is as illustrated in FIG. 5 and which at least includes:

A receiving component 51 is configured to receive one or more pairs of reference signal resources and report modes configured by a network side device; and A reporting component 52 is configured to report channel state information according to the pairs of reference signal resources to the network side device respectively with the corresponding report modes received by the receiving component 51;

The pair of reference signal resources includes one downlink channel measurement reference signal resource and one downlink interference measurement reference signal resource, and the downlink channel measurement reference signal resource is particularly a reference signal resource configured by the network side device for the user equipment to measure a downlink channel of a transmission point, and the downlink interference measurement reference signal resource is particularly a reference signal resource configured by the network side device for the user equipment to measure interference under an interference assumption.

Particularly the receiving component 51 is particularly configured:

To receive the one or more pairs of reference signal resources configured by the network side device; and To receive the report mode configured by the network side device respectively for each pair of reference signal resources.

In addition to this, the receiving component 51 is further configured:

To receive a priority number allocated by the network side device to the pair of reference signal resources, when a received report mode configured by the network side device for a pair of reference signal resources is a periodical report mode and/or a non-periodical report mode.

In another scenario, the receiving component 51 is further configured:

To receive a report periodicity and a report sub-frame offset of channel state information configured by the network side device for the pair of reference signal resources, when a received report mode configured by the network side device for a pair of reference signal resources includes a periodical report mode.

Furthermore the reporting component 51 is particularly configured:

To select a report type according to the periodical report mode, received by the receiving component 51, configured by the network side device, when a report mode, received by the receiving component 51, configured by the network side device for a pair of reference signal resources includes a periodical report mode; and To report the channel state information of the pair of reference signal resources according to the corresponding report mode and the report periodicity and the report sub-frame offset of channel state information configured by the network side device;

Wherein the report type is particularly an existing report type of the periodical report mode, or a report type obtained by modifying an existing report type of the periodical report mode, or a redefined report type of the periodical report mode.

Particularly the user equipment further includes:

A processing component 53 is configured to compare priority numbers, received by the receiving component 51, configured by the network side device for the different pairs of reference signal resources and to instruct the reporting component 52 to report the channel state information of the pair of reference signal resources corresponding to the priority number representing a higher priority, when channel state information of a report type at the same priority of different pairs of reference signal resources to be reported by the reporting component 52 collides.

In another scenario, the receiving component 51 is particularly configured:

To receive one or more channel state information report configurations configured by the network side device, each of which includes a report mode respectively; and To receive one of the pairs of reference signal resources allocated by the network side device to each channel state information report configuration.

Correspondingly the receiving component 51 is particularly configured:

To receive one or more report configuration numbers transmitted by the network side device;

Wherein each report configuration number transmitted by the network side device to the user equipment is different from another report configuration number transmitted by the network side device to the user equipment.

Furthermore the receiving component 51 is further configured:

To receive a priority number allocated by the network side device to the channel state information report configuration, when the report mode included in the channel state information report configuration is a periodical report mode and/or a non-periodical report mode.

Preferably the receiving component 51 is further configured:

To receive a report periodicity and a report sub-frame offset of channel state information configured by the network side device for the channel state information report configuration, when the report mode included in the channel state information report configuration includes a periodical report mode.

It shall be noted that the reporting component 52 is particularly configured:

To select a report type according to the periodical report mode included in the channel state information report configuration, when the report mode included in the channel state information report configuration includes a periodical report mode; and To report the channel state information of the pair of reference signal resources allocated to the channel state information report configuration, according to the corresponding report type and the report periodicity and the report sub-frame offset of channel state information configured by the network side device for the channel state information report configuration;

Wherein the report type is particularly an existing report type of the periodical report mode, or a report type obtained by modifying an existing report type of the periodical report mode, or a redefined report type of the periodical report mode.

Further to this, the user equipment further includes:

A processing component 53 is configured to compare priority numbers, received by the receiving component 51, configured by the network side device for the different channel state information report configurations and to instruct the reporting component 52 to report the channel state information of the channel state information report configuration corresponding to the priority number representing a higher priority when channel state information of a report type at the same priority of different channel state information report configurations to be reported by the reporting component 52 collides.

The technical solution according to the embodiment of the present invention has the following advantage over the prior art:

With the technical solution according to the embodiment of the present invention, the corresponding report modes can be configured for the pairs of reference signal resources composed of the channel measurement reference signal resources and the interference measurement reference signal resources allocated to the user equipment, or the user equipment can be configured with the multiple channel state information report configurations including the corresponding report modes, and a pair of reference signal resources composed of a channel measurement reference signal resource and an interference measurement reference signal resource can be allocated to each channel state information report configuration, and then the user equipment can report the channel state information according to the corresponding pairs of reference signal resources with the corresponding report modes, so that the user equipment reports the channel state information under one or more interference assumptions for the one or more transmission points.

Those skilled in the art can clearly appreciate from the foregoing description of the embodiments that the embodiments of the present invention can be implemented in hardware or can be implemented in software plus a necessary general hardware platform. Based upon such understanding, the technical solution of the embodiments of the present invention can be embodied in the form of a software product which can be stored in a nonvolatile storage medium (which can be a CD-ROM, a U-disk, a mobile hardware disk, etc.) and which includes several instructions to make a computer device (which can be a personal computer, a server, a network side device, etc.) perform the methods in the respective implementation scenarios according to the embodiments of the present invention.

Those skilled in the art should appreciate that that the drawings are merely schematic diagrams of a preferred implementation scenario and the components or the flows in the drawings may not necessarily be required to implement the embodiments of the present invention.

Those skilled in the art should appreciate that the components in the devices of the embodiments can be distributed in the devices of the embodiments as described in the embodiments or located in one or more devices different from those of the embodiments given corresponding variations. The components of the foregoing embodiments can be integrated into a component or further subdivided into a plurality of sub-components.

The embodiments of the present invention have been numbered only for the sake of a convenient description but will not suggest any superiority of one embodiment to another. The foregoing disclosure is merely illustrative of several embodiments of the present invention, but the present invention will not be limited thereto, and any variations that can occur to those skilled in the art shall fall into the scope of the present invention.

What is claimed is:

1. A method for reporting multipoint channel state information, wherein the method comprises the operations of:
    configuring, by a network side device, one or more pairs of reference signal resources and report modes for a user equipment; and
    receiving, by the network side device, channel state information according to the pairs of reference signal resources reported by the user equipment respectively with corresponding report modes;
    wherein the pair of reference signal resources includes one downlink channel measurement reference signal resource and one downlink interference measurement reference signal resource, and the downlink channel measurement reference signal resource is particularly a reference signal resource configured by the network side device for the user equipment to measure a downlink channel of a transmission point, and the downlink interference measurement reference signal resource is particularly a reference signal resource configured by the network side device for the user equipment to measure interference under an interference assumption;
    wherein configuring, by the network side device, the one or more pairs of reference signal resources for the user equipment particularly comprises:
    configuring, by the network side device, the one or more pairs of reference signal resource for the user equipment; and
    configuring, by the network side device, a corresponding report mode respectively for each pair of reference signal resources configured for the user equipment;
    wherein configuring, by the network side device, the one or more pairs of reference signal resources for the user equipment particularly comprises:
    numbering respectively, by the network side device, the respective reference signal resources for measuring downlink channels of the transmission points, and the respective reference signal resources for measuring interference under different interference assumptions, configured by the network side device for the user equipment; and transmitting, by the network side device, pairs of numbers composed of the numbers of the downlink channel measurement reference signal resources and the numbers of the downlink interference measurement reference signal resources included in the one or more pairs of reference signal resources to be configured for the user equipment to the user equipment; or
    combining, by the network side device, in pairs respectively the respective reference signal resources for measuring downlink channels of the transmission points, and the respective reference signal resources for measuring interference under different interference assumptions, configured by the network side device for the user equipment and numbering the respective combinations respectively; and transmitting, by the network side device, the numbers corresponding to the one or more pairs of reference signal resources to be configured for the user equipment respectively to the user equipment.

2. The method according to claim 1, wherein the method further comprises:
    allocating, by the network side device, a priority number to each of the pairs of reference signal resources.

3. The method according to claim 1, wherein the network side device configuring the one or more pairs of reference signal resources and the report modes for the user equipment particularly comprises:
    configuring, by the network side device, the user equipment with one or more channel state information report configurations, each of which includes a periodical report mode and/or a non-periodical report mode respectively; and
    the network side device configuring corresponding one of the pairs of reference signal resources to each channel state information report configuration.

4. The method according to claim 3, wherein the network side device configuring the user equipment with the one or more channel state information report configurations further comprises:
    transmitting, by the network side device, one or more report configuration numbers to the user equipment,
    wherein each report configuration number transmitted by the network side device to the user equipment is different from another report configuration number transmitted by the network side device to the user equipment.

5. The method according to claim 3, wherein the method further comprises:
    allocating, by the network side device, a priority number to the channel state information report configuration.

6. The method according to claim 3, wherein allocating, by the network side device, corresponding one of the pairs of reference signal resources to each channel state information report configuration, further comprises:
    numbering respectively, by the network side device, respective reference signal resources for measuring downlink channels of the transmission points, and respective reference signal resources for measuring interference under different interference assumptions, configured by the network side device for the user equipment; and
    transmitting, by the network side device, pairs of numbers composed of the numbers of the downlink channel measurement reference signal resources and the numbers of the downlink interference measurement reference signal resources included in the pairs of reference signal resources to be configured for the channel state information report configurations to the user equipment corresponding to the channel state information report configurations.

7. The method according to claim 3, wherein allocating, by the network side device, corresponding one of the pairs of reference signal resources to each channel state information report configuration, further comprises:
   combining in pairs respectively, by the network side device, respective reference signal resources for measuring downlink channels of the transmission points, and respective reference signal resources for measuring interference under different interference assumptions, configured by the network side device for the user equipment and numbering respective combinations respectively; and
   transmitting, by the network side device, the numbers corresponding to the pairs of reference signal resources to be configured for the channel state information report configurations to the user equipment corresponding to the channel state information report configurations.

8. A network side device, comprising:
   a configuring component configured to configure one or more pairs of reference signal resources and report modes for a user equipment; and
   a receiving component configured to receive channel state information according to corresponding pairs of reference signal resources reported by the user equipment respectively with the report modes configured by the configuring component,
   wherein the pair of reference signal resources includes one downlink channel measurement reference signal resource and one downlink interference measurement reference signal resource, and the downlink channel measurement reference signal resource is particularly a reference signal resource configured by the network side device for the user equipment to measure a downlink channel of a transmission point, and the downlink interference measurement reference signal resource is particularly a reference signal resource configured by the network side device for the user equipment to measure interference under an interference assumption;
   wherein the configuring component is particularly configured:
   to configure the user equipment with the one or more pairs of reference signal resource; and
   to configure a corresponding report mode respectively for each pair of reference signal resources configured for the user equipment;
   wherein the configuring component configured configure the user equipment with the one or more pairs of reference signal resource is particularly configured to:
   number respectively the respective reference signal resources for measuring downlink channels of the transmission points, and the respective reference signal resources for measuring interference under different interference assumptions, configured by the network side device for the user equipment; and transmit pairs of numbers composed of the numbers of the downlink channel measurement reference signal resources and the numbers of the downlink interference measurement reference signal resources included in the one or more pairs of reference signal resources to be configured for the user equipment to the user equipment; or
   combine in pairs respectively the respective reference signal resources for measuring downlink channels of the transmission points, and the respective reference signal resources for measuring interference under different interference assumptions, configured by the network side device for the user equipment and number the respective combinations respectively; and transmit the numbers corresponding to the one or more pairs of reference signal resources to be configured for the user equipment respectively to the user equipment.

9. The network side device according to claim 8, wherein the configuring component is further configured:
   when a report mode is configured for a pair of reference signal resources as a periodical report mode and/or a non-periodical report mode, to allocate a priority number to the pair of reference signal resources.

10. The network side device according to claim 8, wherein the configuring component is particularly configured:
    to configure the user equipment with one or more channel state information report configurations, each of which includes a report mode respectively; and
    to allocate corresponding one of the pairs of reference signal resources to each channel state information report configuration.

11. The network side device according to claim 10, wherein the configuring component is further configured:
    to allocate a priority number to the channel state information report configuration, when the report mode included in the channel state information report configuration is a periodical report mode and/or a non-periodical report mode.

12. A method for reporting multipoint channel state information, wherein the method further comprises the operations of:
    receiving, by a user equipment, one or more pairs of reference signal resources and report modes configured by a network side device; and
    reporting, by the user equipment, channel state information according to the pairs of reference signal resources to the network side device respectively with corresponding report modes,
    wherein where the pair of reference signal resources includes one downlink channel measurement reference signal resource and one downlink interference measurement reference signal resource, and the downlink channel measurement reference signal resource is particularly a reference signal resource configured by the network side device for the user equipment to measure a downlink channel of a transmission point, and the downlink interference measurement reference signal resource is particularly a reference signal resource configured by the network side device for the user equipment to measure interference under an interference assumption;
    wherein receiving, by the user equipment, the one or more pairs of reference signal resources and the report modes configured by the network side device particularly comprises:
    receiving, by the user equipment, the one or more pairs of reference signal resources configured by the network side device; and
    receiving, by the user equipment, the report mode configured by the network side device respectively for each pair of reference signal resources;
    wherein receiving, by the user equipment, the one or more pairs of reference signal resources configured by the network side device particularly comprises:
    receiving, by the user equipment, pairs of numbers, transmitted by the network side device, of the numbers of the downlink channel measurement reference signal resources and the numbers of the downlink interference measurement reference signal resources included in the one or more pairs of reference signal resources, wherein the numbers are particularly obtained by the network side device respectively numbering respective reference signal resources for measuring downlink channels of the transmission points, and respective reference signal resources for measuring interference under different interference assumptions, configured by the network side device for the user equipment; or receiving, by the user equipment, the numbers corresponding to the one or more pairs of reference signal resources transmitted by the network side device, wherein the numbers are particularly obtained by the network side device combining in pairs respectively respective reference signal resources for measuring downlink channels of the transmission points, and respective reference signal resources for measuring interference under different interference assumptions, configured by the network side device for the user equipment and numbering respective combinations respectively.

13. The method according to claim 12, wherein the method further comprises:

receiving, by the user equipment, a priority number allocated by the network side device to the pair of reference signal resources, wherein when channel state information of a report type at the same priority of different pairs of reference signal resources to be reported by the reporting component collides, the method further comprises:

comparing, by the user equipment, priority numbers configured by the network side device to the different pairs of reference signal resources and reporting the channel state information of the pair of reference signal resources corresponding to the priority number representing a higher priority.

14. The method according to claim 12, wherein receiving, by the user equipment, the one or more pairs of reference signal resources and the report modes configured by the network side device particularly comprises:

receiving, by the user equipment, one or more channel state information report configurations configured by the network side device, each of which includes a report mode respectively; and receiving, by the user equipment, one of the pairs of reference signal resources configured by the network side device to each channel state information report configuration.

15. The method according to claim 14, wherein the user equipment receiving the one or more channel state information report configurations configured by the network side device particularly comprises:

receiving, by the user equipment, one or more report configuration numbers transmitted by the network side device; and wherein each report configuration number transmitted by the network side device to the user equipment is different from another report configuration number transmitted by the network side device to the user equipment.

16. The method according to claim 14, wherein the method further comprises:

receiving, by the user equipment, a priority number allocated by the network side device to the channel state information report configuration, wherein when channel state information of a report type at the same priority of different channel state information report configurations to be reported by the user equipment collides, the method further comprises:

the user equipment comparing priority numbers configured by the network side device to the different channel state information report configurations and reporting the channel state information of the channel state information report configuration corresponding to the priority number representing a higher priority.

17. The method according to claim 14, wherein the user equipment receiving one of the pairs of reference signal resources allocated by the network side device to each channel state information report configuration particularly comprises:

the user equipment receiving pairs of numbers, transmitted by the network side device, of the numbers of the downlink channel measurement reference signal resources and the numbers of the downlink interference measurement reference signal resources included in the pair of reference signal resources of the channel state information report configuration, wherein the numbers are particularly obtained by the network side device respectively numbering respective reference signal resources for measuring downlink channels of the transmission points, and respective reference signal resources for measuring interference under different interference assumptions, configured by the network side device for the user equipment.

18. The method according to claim 14, wherein the user equipment receiving one of the pairs of reference signal resources allocated by the network side device to each channel state information report configuration particularly comprises:

the user equipment receiving the number, transmitted by the network side device, corresponding to the pair of reference signal resources to be configured for the channel state information report configuration; and wherein the number is particularly obtained by the network side device combining in pairs respectively respective reference signal resources for measuring downlink channels of the transmission points, and respective reference signal resources for measuring interference under different interference assumptions, configured by the network side device for the user equipment and numbering respective combinations respectively.

19. A user equipment, comprising:

a receiving component configured to receive one or more pairs of reference signal resources and report modes configured by a network side device; and a reporting component configured to report channel state information according to the pairs of reference signal resources to the network side device respectively with the corresponding report modes received by the receiving component, wherein the pair of reference signal resources includes one downlink channel measurement reference signal resource and one downlink interference measurement reference signal resource, and the downlink channel measurement reference signal resource is particularly a reference signal resource configured by the network side device for the user equipment to measure a downlink channel of a transmission point, and the downlink interference measurement reference signal resource is particularly a reference signal resource configured by the network side device for the user equipment to measure interference under an interference assumption;

wherein the receiving component is particularly configured:

to receive the one or more pairs of reference signal resources configured by the network side device; and to receive the report mode configured by the network side device respectively for each pair of reference signal resources;

wherein the receiving component configured to receive the one or more pairs of reference signal resources configured by the network side device is particularly configured to:

receive pairs of numbers, transmitted by the network side device, of the numbers of the downlink channel measurement reference signal resources and the numbers of the downlink interference measurement reference signal resources included in the one or more pairs of reference signal resources, wherein the numbers are particularly obtained by the network side device respectively numbering respective reference signal resources for measuring downlink channels of the transmission points, and respective reference signal resources for measuring interference under different interference assumptions, configured by the network side device for the user equipment; or receive the numbers corresponding to the one or more pairs of reference signal resources transmitted by the network side device, wherein the numbers are particularly obtained by the network side device combining in pairs respectively respective reference signal resources for measuring downlink channels of the transmission points, and respective reference signal resources for measuring interference under different interference assumptions, configured by the network side device for the user equipment and numbering respective combinations respectively.

20. The user equipment according to claim 19, wherein the receiving component is further configured:

when a received report mode configured by the network side device for a pair of reference signal resources is a periodical report mode and/or a non-periodical report mode, to receive a priority number allocated by the network side device to the pair of reference signal resources, wherein the user equipment further comprises:

a processing component configured, when channel state information of a report type at the same priority of different pairs of reference signal resources to be reported by the reporting component collides, to compare priority numbers, received by the receiving component, configured by the network side device for the different pairs of reference signal resources and to instruct the reporting component to report the channel state information of the pair of reference signal resources corresponding to the priority number representing a higher priority.

21. The user equipment according to claim 19, wherein the receiving component is particularly configured:

to receive one or more channel state information report configurations configured by the network side device, each of which includes a report mode respectively; and to receive one of the pairs of reference signal resources allocated by the network side device to each channel state information report configuration.

22. The user equipment according to claim 21, wherein the receiving component is particularly configured:

to receive one or more report configuration numbers transmitted by the network side device, wherein each report configuration number transmitted by the network side device to the user equipment is different from another report configuration number transmitted by the network side device to the user equipment.

23. The user equipment according to claim 21, wherein the user equipment further comprises:

a processing component configured, when channel state information of a report type at the same priority of different channel state information report configurations to be reported by the reporting component collides, to compare priority numbers, received by the receiving component, configured by the network side device for the different channel state information report configurations and to instruct the reporting component to report the channel state information of the channel state information report configuration corresponding to the priority number representing a higher priority.

* * * * *